United States Patent [19]

Zlotek

[11] 4,373,620

[45] Feb. 15, 1983

[54] ELASTOMERIC ENERGIZER FOR SPRAG CLUTCH

[75] Inventor: T. F. Zlotek, Warren, Mich.

[73] Assignee: Dana Corporation, Toledo, Ohio

[21] Appl. No.: 88,449

[22] Filed: Oct. 26, 1979

[51] Int. Cl.³ .................... F16D 15/00; F16D 41/07
[52] U.S. Cl. .................................. 192/41 A; 192/45.1
[58] Field of Search ................. 192/41 A, 45.1; 188/82.8

[56] References Cited

U.S. PATENT DOCUMENTS

| 2,555,484 | 6/1951 | Gruenberg et al. | 192/45.1 |
| 2,614,670 | 10/1952 | Heintz | 192/45.1 |
| 2,624,436 | 1/1953 | Gamble | 192/45.1 |
| 2,763,354 | 9/1956 | Szady | 192/45.1 |
| 2,793,729 | 5/1957 | Cobb | 192/45.1 |
| 2,812,839 | 11/1957 | Cobb | 192/45.1 |
| 2,883,024 | 4/1959 | Emrick | 192/45.1 X |
| 2,884,101 | 4/1959 | Warn | 192/44 |
| 3,012,646 | 12/1961 | Zlotek | 192/45.1 |
| 3,049,206 | 8/1962 | Zlotek | 192/45.1 |
| 3,324,980 | 6/1967 | Rojic et al. | 192/45.1 |
| 4,130,191 | 12/1978 | Judd et al. | 192/45.1 X |

*Primary Examiner*—Rodney H. Bonck
*Attorney, Agent, or Firm*—Frank B. McDonald

[57] ABSTRACT

An elastomeric energizer for a sprag clutch provides an improved mechanism for engaging the circumferentially spaced sprags thereof with the inner and outer races of the clutch. The energizer also dampens sprag oscillations, thereby cutting clutch chatter, and avoiding localized stresses on the energizing surfaces of the sprags. In a preferred embodiment, the sprag energizer is an O-ring contained within an annular recess formed by grooves in the sides of the individual sprags.

8 Claims, 10 Drawing Figures

ELASTOMERIC ENERGIZER FOR SPRAG CLUTCH

BACKGROUND

This invention relates to sprag clutches, and particularly to energizers as used in sprag clutches for urging the sprags into mechanical engagement with the inner and outer races thereof.

Sprag clutches are utilized principally in indexing operations, such as impact hammer drills for boring. Under high rates of impact, for example those at or exceeding 3,000 impacts per minute, the energizers of such clutch applications have relatively short useful lives, and must consequently be replaced frequently. Conventional energizers are coiled garter springs made of steel, which in addition to chattering against and wearing the energizing surfaces of the sprags, suffer loss of spring tension during useful life, resulting in a continuing increase in response time.

SUMMARY OF THE INVENTION

The sprag clutch energizer disclosed and claimed herein reduces the chatter against and wear of the energizing surfaces of the sprags in contact therewith. Both lighter and more resilient, the energizer of this invention has an inherently quicker response time which is not subject to continuous deterioration over its useful life from loss of spring tension. Thus, in addition to longer useful life, the energizer of this invention renders better response performance under service conditions requiring high impact rates.

DESCRIPTION OF PREFERRED EMBODIMENTS

Figure 1:
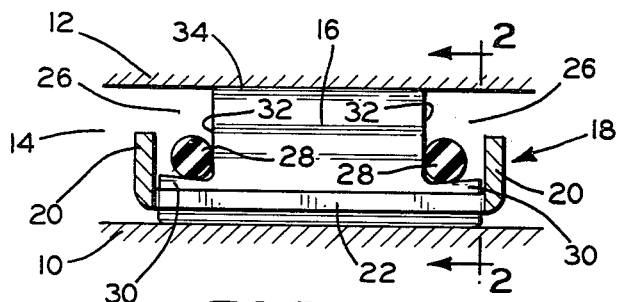
FIG. 1 is a cross sectional view of a portion of a sprag clutch, including a preferred embodiment of the energizer of this invention.

It will be noted, particularly in FIG. 1, that the energizers 28 are separate and distinct from the sprags 16, having only frictional contact therewith. This is in contrast to some designs which integrally mold energizers with sets of sprags. The cross section of the energizer 28, as apparent, does not occupy the total groove cross section. The energizer 28 thus establishes a band of resilient frictional contact over less than the total inside area of the annular recess. This serves to avoid the application of undesirable bending moments to the energizers, and thus allows greater relative freedom of movement for the sprags 16.

Figure 2:
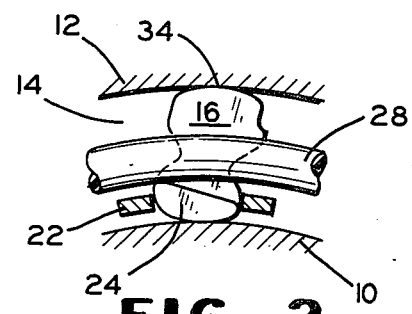
FIG. 2 is an end elevation of the view in FIG. 1 taken along lines 2—2.

A sprag clutch utilizing the elastomeric energizer of this invention comprises annular inner and outer races 10 and 12, respectively, as shown in FIGS. 1 and 2. The races are coaxial and define therebetween an annular space 14 which contains a plurality of circumferentially spaced sprags 16, one of which is shown. In the embodiment of FIGS. 1 and 2, the clutch contains an annular cage member 18 which is positioned with the sprags in the annular space 14 to retain the sprags therein. The cage member 18 comprises two cage rings 20 joined together by cross bars 22, the latter forming interspaces for receiving arcuate inner race engaging portions 24 of sprags 16.

The sprags 16 each contain grooves 26 in the sides thereof for containment of elastomeric energizers 28, which in the embodiment of FIGS. 1 and 2 are contracting O-rings. Thus energizers 28 are slightly stretched in order to apply a contracting or inward force on the plurality of sprags 16. In the embodiment of FIGS. 1 and 2, the sprags 16 each contain two ears 30 projecting outwardly thereof, from side walls 32, and parallel to the rotational axis of the clutch (vis. perpendicularly to the plane of FIG. 2). As will be noted in FIG. 1, ears 30 comprise the lateral extremities of the above-noted arcuate inner race engaging portions 24 of the sprags 16. The interface of the side wall 32 and ear 30 form the aforesaid groove 26 in each sprag 16. The groove 26 in each of the circumferentially spaced sprags 16 aligns with the groove of each adjacent sprag. Together the grooves form an annular recess in the plurality of sprags which lies in the plane of FIG. 2, and contains the O-ring energizer 28.

Referring now to FIG. 2, it may be appreciated that as the inner race 10, as a driver, would turn clockwise relative to the outer race 12, the inner race engaging portion 24 of sprag 16 will be in contact with inner race 10 by virtue of the contracting energizer 28. Friction between the latter surfaces will force the sprag 16 to cock counterclockwise, thus forcing the outer race engaging portion 34 into contact with the outer race 12, thus tending to lock the two races together in a driving relationship. As, however, the inner race is retarded, the outer race 12 will "overrun" the inner race 10 by turning clockwise relative thereto, the sprag 16 will be forced to cock clockwise thus freeing the two races from driving relationship. In the operation of an impact hammer or similar equipment enduring rapid cycling of the aforementioned positional relationships, it may be appreciated that the energizer will be subjected to severe cyclic forces. The lighter relative weight of elastomer to steel ensures reduction in such forces, thus enhancing energizing response. The resilient nature of the elastomer surface as compared to steel surfaces ensures less wearing of both the energizer and the sprags in contact therewith. In addition, chatter is controlled because of the resilient yielding nature of the energizer.

Figure 3:
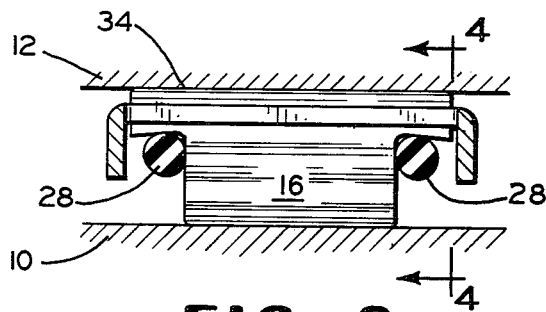
FIG. 3 is a second cross sectional view of a portion of a sprag clutch, including a second preferred embodiment of the engergizer of this invention.
Figure 4:
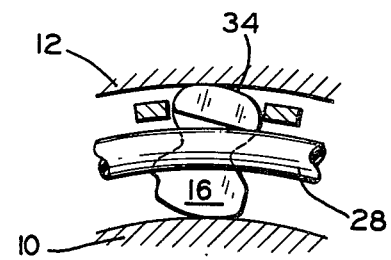
FIG. 4 is an end elevation of the view in FIG. 3 taken along lines 4—4.

The elastomeric energizer 28 may be utilized successfully in still other embodiments. Thus FIGS. 3 and 4 show a sprag clutch of the expanding energizer type, wherein an elastomeric energizer 28 may be compressed slightly in order to effectuate a friction drag relationship between the outer race engaging portion 34 of sprag 16 and the outer race 12. In the latter case, the outer race would function as driver, and counterclockwise motion thereof (FIG. 4) would lock the races in the manner heretofore described.

Figure 5:
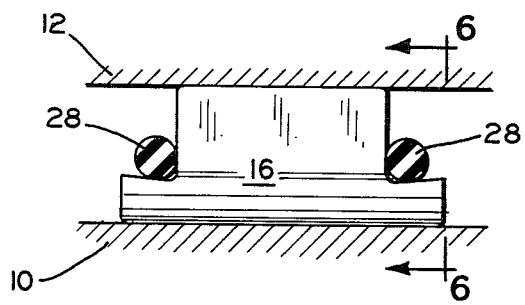
FIG. 5 is a third cross sectional view of a portion of a sprag clutch which is similar to that of FIG. 1 (except that the clutch of FIG. 5 is without a cage) which includes the first preferred embodiment of the energizer as shown in FIG. 1.
Figure 6:
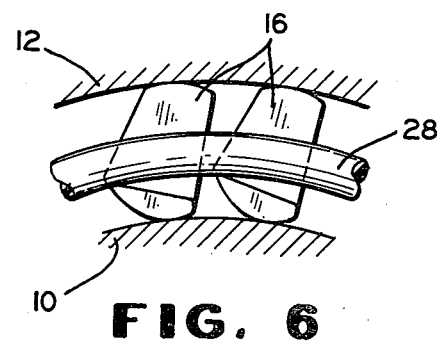
FIG. 6 is an end elevation of the view in FIG. 5 taken along lines 6—6.

FIGS. 5 and 6 show a sprag energizer 28 of the contracting type as in FIGS. 1 and 2, but shown operating in a cageless sprag clutch, the latter being familiar to those skilled in the art.

Figure 7:
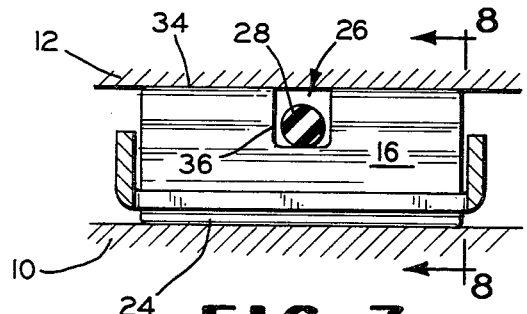
FIG. 7 is a fourth cross sectional view of a portion of a sprag clutch, including the first preferred embodiment of the energizer of this invention.
Figure 8:
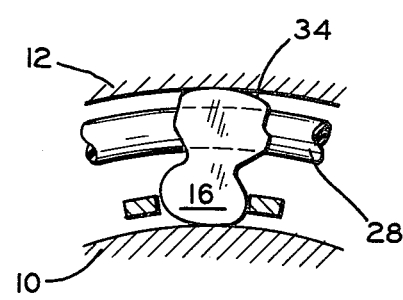
FIG. 8 is an end elevation of the view in FIG. 7 along lines 8—8.

FIGS. 7 and 8 show yet another embodiment of a sprag clutch utilizing the present invention. The sprag 16 (FIG. 7) contains a groove 26 defined by a U-shaped slot 36 in its outer race engaging portion 34. In the preferred embodiment of FIG. 7, the slot 36 is centered within the portion 34, however it could just as well be offset, and it could have a shape other than a "U", as for example, a "V". In addition the elastomeric energizer shown in FIG. 7 is of a contracting type. Alternatively, an expanding elastomeric energizer could be used, wherein the slot 36 would be positioned in the inner race engaging portion 24 of the sprag 16.

Figure 9:
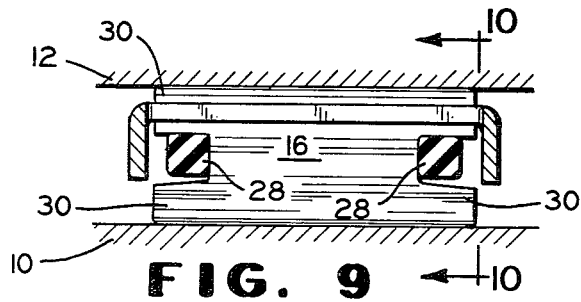
FIG. 9 is a fifth cross sectional view of a portion of a sprag clutch, including a third preferred embodiment of the energizer of this invention.
Figure 10:
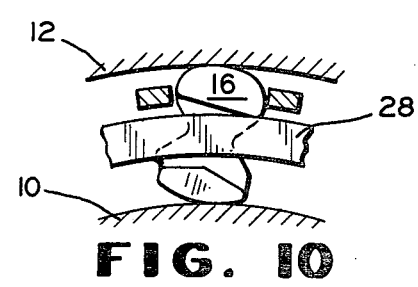
FIG. 10 is an end elevation of the view in FIG. 9 along lines 10—10.

FIGS. 9 and 10 show an elastomeric energizer 28 having a square cross section rather than a circular cross section as exemplified in the previous figures. Thus, the invention has been shown to be amenable to many configurations; both as to style of the sprag clutch in which the energizer is used, as well as to the cross section of the energizer per se.

The elastomers, as used herein, are preferably of high polymer materials, exhibiting little plastic flow, and quick and nearly complete recovery from an extending force, as for example, Nitrile or Buna N.

What is claimed is:

1. In a sprag clutch assembly including a plurality of circumferentially spaced sprags, each sprag having a groove in at least one side thereof, the groove of each sprag being in alignment with the groove of each adjacent sprag, wherein the grooves define an annular recess in the plurality of sprags in a plane perpendicular to the rotational axis of the sprag clutch assembly, an improvement comprising a sprag energizer of elastomeric material contained within said recess, said energizer being non-integrally molded with respect to said sprags, said energizer being of relative dimension as to occupy less than the total volume of each groove, said energizer forming a band of resilient frictional contact over less than the total surface area of each groove, whereby said individual sprags do not apply bending moments to said energizer.

2. The sprag clutch assembly of claim 1 further comprising an inner and an outer race, said races being coaxial and defining an annular space therebetween, said sprags being contained within said annular space, each of said sprags having arcuate race engaging portions, and a sprag retainer contained within said annular space for circumferential containment of said sprags, and wherein said retainer includes cross bars defining apertures therebetween, each of said apertures receiving one of said race engaging portions of said sprags.

3. The sprag clutch assembly of claim 2 wherein each sprag further comprises two side walls disposed between said inner and outer race engaging portions, each of said side walls having at least one ear protruding outwardly thereof parallel to said rotational axis, said ear comprising an extremity of one of said race engaging portions, wherein the interface of said wall and said ear defines said groove of each sprag, said plurality of grooves defining said annular recess.

4. The sprag clutch assembly of claim 3 wherein each of said side walls of each sprag has at least one of two of said ears protruding therefrom, wherein one of said ears is an inner ear comprising an extremity of the inner race engaging portion of the sprag, the other an outer ear comprising an extremity of the outer race engaging portion.

5. The sprag clutch assembly of claim 4 wherein said elastomeric sprag energizer is contained within said groove defined by the interface of said wall and said inner ear, and wherein said energizer is a contracting O-ring.

6. The sprag clutch assembly of claim 4 wherein said elastomeric sprag energizer is contained within said groove defined by the interface of said wall and said outer ear, and wherein said energizer is an expanding O-ring.

7. The sprag clutch assembly of claim 2 wherein said groove is defined by a U-shaped slot in at least one of said inner and outer race engaging portions of each of said sprags.

8. The sprag clutch assembly of claim 4 or claim 7 wherein the cross-section of said elastomeric sprag energizer is square.

* * * * *